United States Patent [19]
Lee et al.

[11] Patent Number: 6,152,039
[45] Date of Patent: Nov. 28, 2000

[54] INITIATION OF PROPELLANTS

[75] Inventors: Peter Raymond Lee, Kent; Francis Sidney Baker, Shropshire, both of United Kingdom

[73] Assignee: Royal Ordnance plc, Chorley, United Kingdom

[21] Appl. No.: 08/199,304

[22] PCT Filed: Sep. 4, 1991

[86] PCT No.: PCT/GB91/01499

§ 371 Date: May 24, 1994

§ 102(e) Date: May 24, 1994

[87] PCT Pub. No.: WO93/05356

PCT Pub. Date: Mar. 18, 1993

[51] Int. Cl.[7] .................................................. F42B 3/10
[52] U.S. Cl. ........................................................ 102/200
[58] Field of Search ................................. 102/200, 202

[56] References Cited

U.S. PATENT DOCUMENTS

| | | | |
|---|---|---|---|
| 3,601,054 | 8/1971 | Christianson | 102/200 |
| 4,446,826 | 5/1984 | Kimura et al. | 123/143 B |
| 5,088,411 | 2/1992 | Kurokawa et al. | 102/200 |
| 5,146,044 | 9/1992 | Kurokawa et al. | 102/202.5 |

FOREIGN PATENT DOCUMENTS

| | | | |
|---|---|---|---|
| 426 110 A2 | 5/1991 | European Pat. Off. | 102/202 |
| 93600 | 4/1993 | Japan | 102/200 |
| 2234335 | 1/1991 | United Kingdom | 102/200 |
| 2241563 | 9/1991 | United Kingdom | 102/200 |

OTHER PUBLICATIONS

Microwave Resonant Absorption of Potential Exothermic Compounds, Final Report; Dr. F.J. Murray, General Dynamics Corp., Pomona, CA, Dec. 1989.

Electrothermal Thrusters Utilizing Electrodeless Discharges; Tahara et al, Osaka University; Extract from the 20th International Electric Propulsion Conference, p. 575–582, 1988.

*Primary Examiner*—Charles T. Jordan
*Attorney, Agent, or Firm*—Nixon & Vanderhye P.C.

[57] ABSTRACT

An apparatus for the initiation of a propellant comprises a combustion chamber such as barrel 6, a charge of propellant 5 in the chamber and means for igniting the propellant of the charge by microwave heating comprising a source of microwave radiation 11, a microwave transparent window 9 in a wall of the said chamber and, means for applying microwaves from the said source into the said chamber via the said window. The apparatus may be used in a gun as shown or in a rocket motor.

28 Claims, 1 Drawing Sheet

INITIATION OF PROPELLANTS

BACKGROUND OF THE INVENTION

1. Field of the Invention

The present invention relates to the initiation of propellants, especially for guns, rockets, gas generators and similar known applications.

2. Discussion of Prior Art

Present techniques for the initiation of propellants are not ideal in a number of respects. For example, large calibre guns may incorporate a charge of stick propellant, (ie. a collection of propellant sticks) which is initiated by a device known in the United Kingdom as a tube vent electric (TVE). In such a device a hot burning material is caused to deflagrate rapidly by the conversion of an electrical stimulus into hot particle output through holes in its body thereby initiating the surrounding propellant material. Internal ballistics and reproducibility of gun performance are affected. The TVE also occupies a significant fraction of the volume of the propellant charge. The initiatory material in the TVE is moisture-sensitive and is also sensitive to rough usage so that the propellant may or may not ignite in the manner predicted and even when it does ignite the burning process may be unpredictable.

Modern gun propellants may comprise compositions formulated to have low vulnerability to attack by bullets, fragments and the like. Such compositions are inherently more difficult to initiate and it may be difficult or impossible to initiate such compositions by conventional techniques.

In rocket motors the design of the propellant igniter presents problems. The igniter throws a rain of rapidly moving burning particles into the propellant charge. The energy of the igniter is often so high that the charge may be damaged, especially at low temperatures, and this can lead to unpredictable ballistics.

SUMMARY OF THE INVENTION

According to the present invention, there is provided an apparatus for the initiation of a propellant comprising a combustion chamber, a charge of propellant in the chamber and means for igniting the propellant of the charge by microwave heating comprising a source of microwave radiation, a microwave transparent window in a wall of the said chamber and means for applying microwaves from the said source into the said chamber via the said window, the propellant charge, or one or more regions thereof, comprising or containing microwave sensitive material for absorbing microwave energy from said source whereby to heat and ignite the propellant, and wherein the said chamber is a resonant cavity for the microwaves.

The means for applying microwaves from the said source may be a conventional waveguide structure.

The propellant of the charge is preferably a solid propellant comprising a gun or rocket propellant, although it may also be a propellant for use in a gas generator, eg for use in a gas inflator or base drag reduction of a projectile.

The frequency of microwaves provided by the said source may conveniently be variable so that the frequency may be tuned to match the dimensions of the chamber.

The source may be any known source such as a klystron or a solid state oscillator such as a Gunn diode, avalanche diode or impatt diode.

The frequency of the microwaves coupled into the propellant charge is likely to be in the range 0.1 GHz to 100 GHz.

The required energy density of the microwaves coupled into the propellant charge depends on the microwave sensitive material to be energised. The energy density is likely to be at least $10^8$ watts per kg of material to be excited for a typical lossy dielectric used in conjunction with a typical, eg. double base, propellant material. The energy density may however be reduced if the microwave sensitive material is itself more easily ignitable than the propellant.

The propellant charge to be ignited may comprise material which itself is microwave sensitive. For example, propellants containing as major ingredients nitrocellulose and nitroglycerine have been found to show the required sensitivity.

Alternatively, or in addition, a microwave sensitive additive or dopant material may be added to the propellant composition for the purpose of absorbing the energy of the applied microwaves and thereby heating the propellant composition within the charge.

The applied microwaves may be coupled into the microwave sensitive material by any known coupling effect. For example, the microwave sensitive material may comprise one or more strips or portions of a resistive conductor, eg. graphite or aluminium, into which the energy is coupled resistively. Alternatively, the coupling may be direct due to the orientation polarisation of a lossy dielectric which constitutes the microwave sensitive material. Such a dielectric, which may comprise the propellant composition, or one or more portions or regions of an inert microwave sensitive dielectric embedded or implanted therein is preferably sufficiently lossy that the tangent of its loss angle (tan δ) is greater than 0.05, especially greater than 0.1 at its relaxation frequency. Examples of a variety of lossy inert dielectrics are known to those versed in the microwave heating art and are suitable for applicability in the present invention.

The propellant material initiated by the apparatus according to the present Invention is not critical to successful operation of the invention, although It has been found that certain propellant materials are especially suitable for microwave initiation. Thus, multi-base compositions ie. those comprising nitroglycerine and nitrocellulose, particularly those having a nitroglycerine content in the range 20 to 50 weight per cent are especially microwave sensitive because of their relatively high dielectric susceptibilities.

Low vulnerability propellants, eg. based upon compositions containing as highly energetic filler component(s) one or more heteroalicyclic nitramines such as RDX or HMX, together with a polymeric binder eg. polyurethane or polyester) may also be initiated by the apparatus of the present invention.

As will be familiar to those skilled in the propellants art, suitable propellant compositions of the above classes may contain as optional additives inert or energetic plasticisers, moderators, flame temperature reducers eg nitroguanidine, antioxidants, flash suppressants etc.

Furthermore, other energetic fillers such as inorganic nitrates or perchlorates, and metallic fuels such as aluminium may partially or wholly replace the highly energetic components of the aforementioned classes of propellants.

The advantages of igniting propellant charges by microwave excitation by the apparatus of the present invention compared with conventional techniques, eg. using a TVE as as described above, are as follows:

(a) no moving parts are necessary;

(b) the burning of the propellant may be controlled to be more uniform reducing unwanted pressure exponents; a uniform flame front can be established from an ignited cylinder of microwave sensitive material which for example allows the internal ballistics in a gun to be improved.

(c) regions of the propellant charge may be selectively ignited by selective placement of the regions of microwave sensitive material within the charge.

(d) propellants of low vulnerability to bullet or other projectile attack may be ignited by the microwave sensitivity of additive(s) incorporated within the charge; the additive in this case is preferably readily ignitable upon heating, eg. rubber or plastics material containing an energetic additive such as an energetic plasticiser, eg. glycidyl azide polymer (GAP) or bis-2, 3-dinitropropylacetal/formal (BDNPA/F).

Where the propellant charge used in the apparatus according to the present invention is a charge for a large calibre gun, eg. of calibre 30 mm or more, the charge may comprise sticks in which the microwave sensitive material is distributed uniformly throughout the charge. For example, every 1 in 5 to 50 sticks may be doped with microwave sensitive additive. Where the charge is made up of granules or short chopped sticks dopant granules may be spread evenly throughout the charge. Consequently, it is possible by the present invention to produce propellant charges based on sticks, chopped sticks or granules with more predictable light-up and internal ballistics.

Alternatively, the microwave sensitive material may be a region specially located at the centre of a resonant cavity formed by the said chamber.

The microwave sensitive material may itself be embedded in an inert coating, eg. to provide a compatible interface with the propellant material. The coating may be metallic, eg. of aluminium foil, effectively to minimise the dimensions of the resonant cavity or it may for example be an inert plastics material. Numerous inert microwave sensitive materials are known to those familiar with the microwave heating art. For example, materials selected from those described in the following patent specifications can be used as inert microwave sensitive dopants for propellant charge materials, either by direct doping of the propellant material or for inclusion within an intermediate layer to provide propellant compatible coating: GB2065027A, GB2081560B, U.S. Pat No. 4,538,630, U.S. Pat. No. 4,482,239, Canadian 1,108, 276, U.S. Pat. No. 4,655,276, European 0242952A.

Where the propellant charge in the apparatus according to the present invention comprises a rocket motor charge, the igniter of the charge may be replaced by a layer of microwave sensitive material placed in a strategic point or in strategic points within the charge. Furthermore, the motor may be constrained to burn in a particular selected way without recourse to complex charge shapes.

Microwaves have been employed in the prior art to heat castable high explosive materials to melt them. For example, explosive fillings have been removed from unexploded shells by this method. However, propellants have not hitherto ignited in this way. By heating a propellant material in a controlled arrangement in accordance with the present invention to provide initiation thereof unexpectedly the benefits described above are obtained.

According to the present invention in another aspect a method of initiating a propellant of a propellant charge located in a chamber comprises applying to the charge from a waveguide source through a microwave transparent window microwave energy to ignite the propellant.

BRIEF DESCRIPTION OF THE DRAWINGS

Embodiments of the present invention will now be described by way of example with reference to the accompanying drawings in which.

DETAILED DISCUSSION OF PREFERRED EMBODIMENTS

Figure 1:
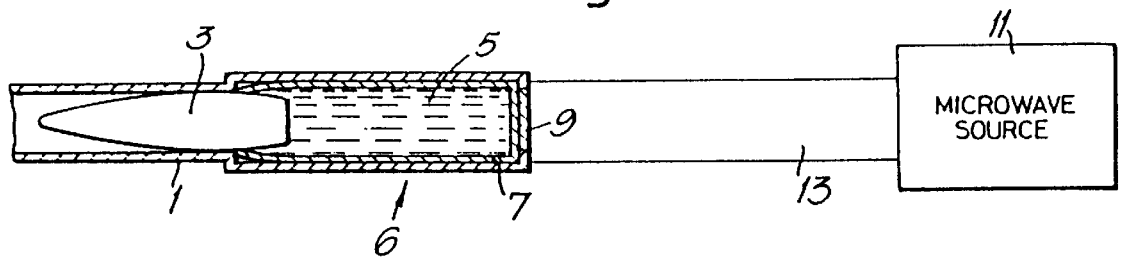
FIG. 1 is a cross-sectional side elevation of a gun comprising a microwave ignition arrangement.

In FIG. 1, the gun shown comprises a barrel 1, eg of a hard metal such as steel, in which is housed a shell 3 to be fired from the barrel 1 by a propellant charge 5 contained in an enlarged region 6 of the barrel 1. The charge 5, housed in a dielectric combustible cartridge case 7, has adjacent to its rear end a microwave transparent window 9, eg of a quartz, in a rear end of the enlarged region 6 of the barrel 1 thereby sealing that end. Microwaves from a klystron or other microwave source 11 are applied at a selected instant in time in a conventional way via a waveguide 13 through the window 9 to the interior of the chamber enclosed by the enlarged region 6 of the barrel 1 and the window 9 in which the charge 5 is housed. The frequency and power output of the source 11 have been previously adjusted, eg. using the results of prior calibration results, so that the microwave radiation coupled into the charge 5 is suitable to ignite the propellant of the charge 5 in one of the ways described above. Such ignition causes propulsion of the shell 3 along the barrel 1 in a conventional manner.

Figure 2:
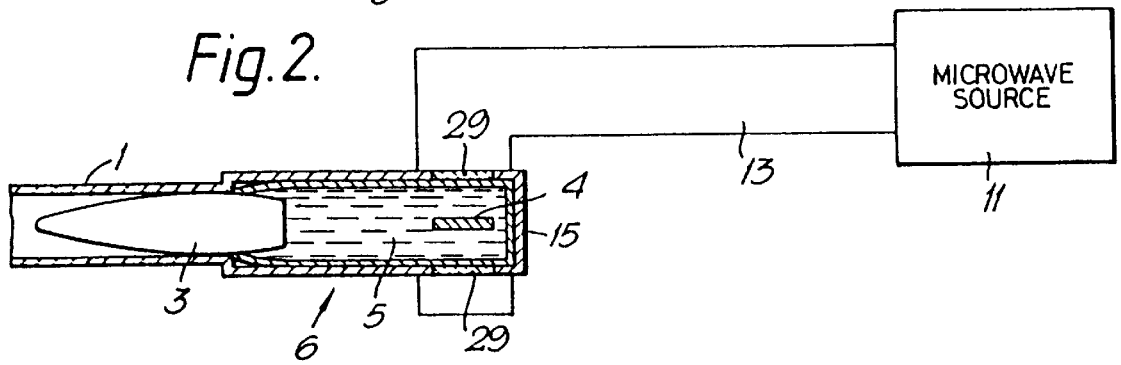
FIG. 2 is a cross-sectional side elevation of a gun comprising an alternative microwave ignition arrangement.

The gun shown in FIG. 2 is similar to that shown in FIG. 1, and the like parts are indicated by like reference numerals. However, in FIG. 2 the rear window 9 is replaced by a rear metal end plate 15. Instead, there are one or more lateral microwave transparent windows 29 fitted in the side wall of the barrel 1 and the waveguide output from the source 11 is applied via the waveguide 13 to the window(s) 29. The charge 5 incorporates a cylinder 4 of microwave sensitive inert material at the centre of the cylinder bounded by the window(s) 29 which serves as an ignition centre within the charge 5. The shell 3 is propelled along the barrel 1 when appropriate microwave input in applied to the cylinder 4 (from the source 11 via the waveguide 13) and causes sufficient localised heating of the cylinder 4 to ignite the propellant of the charge 3.

Figure 3:
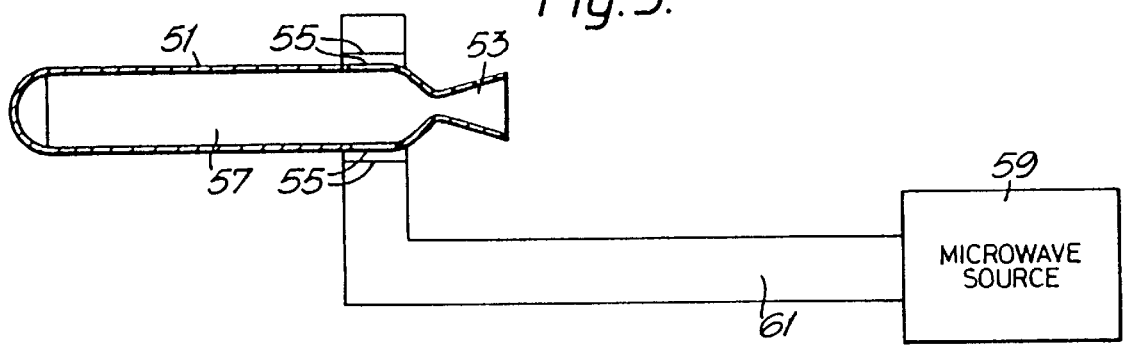
FIG. 3 is a cross-sectional side elevation of a rocket motor comprising a microwave ignition arrangement.

In FIG. 3 the rocket motor shown comprises a conventional metallic body 51 having at one end a thruster nozzle 53 and in the cylindrical part of the body 51 near the thruster nozzle 53 a dielectric window or windows 55. Inside the body 51 is housed a propellant charge 57. The charge 57 is initiated, when required, by the output from a microwave source 59 coupled into the material of the charge 57 via a waveguide 61 and the window(s) 55.

The body 51 may In an alternative embodiment be made of a dielectric, eg fibre reinforced or strip-wound composite, which itself provides the window 55.

Figure 4:
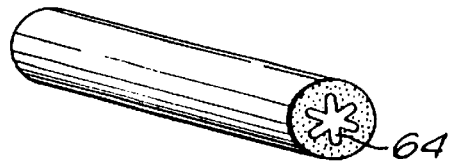
FIG. 4 is a perspective view of a propellant charge suitable for use in the rocket motor shown in FIG. 3.

FIG. 4 shows an example of a charge suitable for use as the charge 57 shown in FIG. 3. The charge contains along its axis a region 64 having a cross-section approximating a star-shape in which region 64 microwave sensitive material is concentrated. Such a region replaces the corresponding hollow star-shaped region which may be provided in a conventional rocket propellant charge to give a selected thrust v time characteristic curve. In the prior art case the internal surface of the charge along the hollow region is ignited by the spitting of hot gases and fragments along the hollow region. Light-up is unpredictable and the charge presents a different surface to the igniferous material if it is pre-cracked by storage or rough handling or by the effect of the ignition process.

The propellant charge shown in FIG. 4 shows a required burning curve with a more controlled burning effect.

The cross-sectional area of the star-shaped region 31 may be constant throughout the charge. Alternatively it may vary progressively to give different motor characteristics at different burning times.

The important benefits of cylindrical rocket motor charges having a microwave sensitive material concentrated along a region along the axis of the charge as shown in FIG. 4 are as follows:

(a) consistent light-up is provided at all points along the interfaces between the microwave-sensitive material and the undoped propellant;

(b) there is less propensity for the charge to crack under adverse storage and transport conditions especially where the microwave sensitive material has physical and thermomechanical properties similar to the main propellant, eg. where it comprises doped propellant material;

(c) more complex shaped regions may be provided on the axis of the charge (than are currently used with hollow prior art charges) to provide ignition to tailor pressure and thrust v time curve of the rocket motor more precisely and over a greater range.

What is claimed is:

1. An apparatus for the initiation of a propellant, said apparatus comprising:
   a combustion chamber;
   a charge of propellant in the chamber; and
   means for igniting the propellant of the charge by microwave heating comprising:
      a source of microwave radiation;
      a microwave transparent window in a wall of said chamber; and
      means for applying microwaves from said source into said chamber via said window, at least a portion of the propellant charge comprising microwave sensitive material for absorbing microwave energy from said source to heat and ignite the propellant, and wherein at least a portion of said chamber is a substantially resonant cavity having a fixed size for the microwaves.

2. An apparatus as claimed in claim 1 and wherein the means for applying microwaves from the said source is a waveguide structure.

3. An apparatus as claimed in claim 1 and wherein the frequency of microwaves provided by the said source is variable so that the frequency may be tuned to match the dimensions of the chamber.

4. An apparatus as claimed in claim 3 and wherein the frequency of the microwaves provided by the source is in the range of 0.1 GHz to 100 GHz.

5. An apparatus as claimed in claim 1, wherein said at least a portion of said chamber comprises all of said combustion chamber.

6. An apparatus for the initiation of a propellant, said apparatus comprising:
   a combustion chamber;
   a charge of propellant in the chamber; and
   means for igniting the propellant of the charge by microwave heating comprising:
      a source of microwave radiation;
      a microwave transparent window in a wall of said chamber; and
      means for applying microwaves from said source into said chamber via said window, at least a portion of the propellant charge comprising microwave sensitive material for absorbing microwave energy from said source to heat and ignite the propellant, and wherein at least a portion of said chamber is a substantially resonant cavity for the microwaves, and wherein an inert microwave sensitive dopant material is added to the propellant composition for the purpose of absorbing the energy of the applied microwaves and thereby heating the propellant composition within the charge.

7. An apparatus as claimed in claim 6 and wherein the inert microwave sensitive dopant material comprises at least one portion of a resistive conductor into which the microwave energy may be coupled resistively.

8. An apparatus as claimed in claim 6 and wherein the inert microwave sensitive dopant material is a region specially located at the centre of the resonant cavity formed by the said chamber.

9. An apparatus as claimed in claim 6 and wherein the inert microwave sensitive dopant material is itself embedded in an inert coating to provide a compatible interface with the propellant material.

10. An apparatus for the initiation of a propellant, said apparatus comprising:
    a combustion chamber;
    a charge of propellant in the chamber; and
    means for igniting the propellant of the charge by microwave heating comprising:
       a source of microwave radiation;
       a microwave transparent window in a wall of said chamber; and
       means for applying microwaves from said source into said chamber via said window, at least a portion of the propellant charge comprising microwave sensitive material for absorbing microwave energy from said source to heat and ignite the propellant, and wherein at least a portion of said chamber is a substantially resonant cavity for the microwaves, and wherein at least one of the propellant composition and a portion of an inert microwave sensitive dielectric embedded in said propellant composition, comprises a lossy dielectric which is sufficiently lossy that the tangent of its loss angle ($\tan \delta$) is greater than 0.05 at its relaxation frequency.

11. An apparatus for the initiation of a propellant, said apparatus comprising:
    a combustion chamber;
    a charge of propellant in the chamber; and
    means for igniting the propellant of the charge by microwave heating comprising:
       a source of microwave radiation;
       a microwave transparent window in a wall of said chamber; and
       means for applying microwaves from said source into said chamber via said window, at least a portion of the propellant charge comprising microwave sensitive material for absorbing microwave energy from said source to heat and ignite the propellant, and wherein at least a portion of said chamber is a substantially resonant cavity for the microwaves, and wherein the propellant charge is a charge for a large calibre gun, of at least calibre 30 mm, and the charge comprises propellant sticks in which the microwave sensitive material is distributed uniformly throughout the charge.

12. An apparatus for the initiation of a propellant, said apparatus comprising:
    a combustion chamber;
    a charge of propellant in the chamber; and
    means for igniting the propellant of the charge by microwave heating comprising:
        a source of microwave radiation;
        a microwave transparent window in a wall of said chamber; and
        means for applying microwaves from said source into said chamber via said window, at least a portion of the propellant charge comprising microwave sensitive material for absorbing microwave energy from said source to heat and ignite the propellant, and wherein at least a portion of said chamber is a substantially resonant cavity for the microwaves, and wherein the charge comprises chopped sticks and granules doped with inert microwave sensitive material spread evenly throughout the charge.

13. An apparatus for the initiation of a propellant, said apparatus comprising:
    a combustion chamber;
    a charge of propellant in the chamber; and
    an ignitor for igniting the propellant of the charge by microwave heating comprising:
        a source of microwave radiation; and
        a source of microwaves provided into said chamber, at least a portion of said propellant charge comprising microwave sensitive material for absorbing microwave energy from said source to heat and ignite the propellant, and wherein at least a portion of said chamber comprises substantially a resonant cavity for the microwaves, said resonant cavity having a fixed size and including therein at least a portion of said microwave sensitive material.

14. An apparatus as claimed in claim 13, wherein said at least a portion of said chamber comprises all of said combustion chamber.

15. An apparatus as claimed in claim 13, wherein said at least a portion of said microwave sensitive material comprises all of said microwave sensitive material.

16. An apparatus as claimed in claim 13, wherein said combustion chamber comprises a gun combustion chamber.

17. An apparatus as claimed in claim 16, wherein said microwave sensitive material is distributed throughout said propellant in said gun combustion chamber.

18. An apparatus as claimed in claim 13, wherein said combustion chamber comprises a rocket combustion chamber.

19. An apparatus as claimed in claim 18, wherein said microwave sensitive material is distributed throughout said propellant in said rocket combustion chamber.

20. An apparatus as claimed in claim 19, wherein said microwave sensitive material is located at at least one strategic point of desired ignition of said propellant in said rocket combustion chamber.

21. An apparatus for the initiation of a propellant, said apparatus comprising:
    a combustion chamber;
    a charge of propellant in the chamber; and
    an ignitor for igniting the propellant of the charge by microwave heating comprising:
        a source of microwave radiation; and
        a source of microwaves provided into said chamber, at least a portion of said propellant charge comprising microwave sensitive material for absorbing microwave energy from said source to heat and ignite the propellant, and wherein at least a portion of said chamber comprises substantially a resonant cavity for the microwaves, said resonant cavity including therein at least a portion of said microwave sensitive material, said combustion chamber comprises a gun combustion chamber, and wherein said microwave sensitive material is concentrated in the shape of a cylinder located in said combustion chamber.

22. A method for the initiation of a propellant where said propellant is located within a combustion chamber, said method comprising the steps of:
    providing at least one resonant cavity having a fixed size within said combustion chamber, said at least one resonant cavity including propellant therein;
    including a microwave sensitive material for absorbing microwave energy in at least a portion of said propellant in said at least one resonant cavity; and
    applying microwave energy to said at least one resonant cavity, said microwave energy of a wavelength substantially resonant in said at least one resonant cavity and of an amplitude sufficient to heat and ignite the propellant in said at least one resonant cavity.

23. A method for the initiation of a propellant as claimed in claim 22, wherein said combustion chamber comprises a gun combustion chamber, and said applying step includes applying said microwave energy through a microwave transparent window in said gun combustion chamber.

24. A method for the initiation of a propellant as claimed in claim 23, wherein said microwave sensitive material is distributed throughout said propellant in said gun combustion chamber.

25. A method for the initiation of a propellant as claimed in claim 22, wherein said combustion chamber comprises a rocket combustion chamber, and said applying step includes applying said microwave energy through a microwave transparent window in said rocket combustion chamber.

26. A method for the initiation of a propellant as claimed in claim 25, wherein said microwave sensitive material is distributed throughout said propellant in said rocket combustion chamber.

27. A method for the initiation of a propellant as claimed in claim 25, wherein said microwave sensitive material is located at at least one strategic point of desired ignition of said propellant in said rocket combustion chamber.

28. A method for the initiation of a propellant where said propellant is located within a combustion chamber, said method comprising the steps of:
    providing at least one resonant cavity within said combustion chamber, said at least one resonant cavity including propellant therein;
    including a microwave sensitive material for absorbing microwave energy in at least a portion of said propellant in said at least one resonant cavity; and
    applying microwave energy to said at least one resonant cavity, said microwave energy of a wavelength substantially resonant in said at least one resonant cavity and of an amplitude sufficient to heat and ignite the propellant in said at least one resonant cavity, said combustion chamber comprises a gun combustion chamber, and said applying step includes applying said microwave energy through a microwave transparent window in said gun combustion chamber, wherein said microwave sensitive material is concentrated in a cylinder located in said propellant in said gun combustion chamber.

* * * * *